United States Patent [19]

Dresdner

[11] Patent Number: 4,667,236

[45] Date of Patent: May 19, 1987

[54] TELEVISION PERSPECTIVE EFFECTS SYSTEM

[75] Inventor: Daniel Dresdner, Gainesville, Fla.

[73] Assignee: Digital Services Corporation, Gainesville, Fla.

[21] Appl. No.: 727,890

[22] Filed: Apr. 26, 1985

[51] Int. Cl.[4] ............... H04N 5/14; H04N 5/262; H04N 9/64

[52] U.S. Cl. ............... 358/160; 358/22; 358/183; 364/522; 340/727; 340/729

[58] Field of Search ............... 358/22, 160, 183; 340/727, 729; 364/521, 522

[56] References Cited

U.S. PATENT DOCUMENTS

| | | | |
|---|---|---|---|
| 4,011,401 | 3/1977 | Presti | 358/160 |
| 4,432,009 | 2/1984 | Reitmeier et al. | 358/22 |
| 4,472,732 | 9/1984 | Bennett et al. | 358/22 |
| 4,533,952 | 8/1985 | Norman, III | 358/160 |
| 4,542,377 | 9/1985 | Hagen et al. | 340/727 |

Primary Examiner—James J. Groody
Assistant Examiner—Michael D. Parker
Attorney, Agent, or Firm—Charles A. Bevelacqua

[57] ABSTRACT

This invention employs an incremental technique for performing a perspective transformation on a planar television image. The equipment modifies the coefficients to a two by two matrix multiplier at the pixel or line rate. This allows for perspective generation along either the X or Y axis of the television screen. The invention will also provide perspective generation for rotation of the image about the Z axis in addition to the rotation about one of the X or Y axes.

4 Claims, 5 Drawing Figures

TELEVISION PERSPECTIVE EFFECTS SYSTEM

BACKGROUND OF THE INVENTION

This invention relates to a system and method in which a television picture is manipulated to produce a change of size, shape, position or angular rotation. Particularly it relates to manipulations to impart the illusion of perspective or three dimensional characteristics to a two dimensional picture. This is done by having the images on the screen appear to be seeking a vanishing point. Stated another way, the images will appear to "keystone" or "foreshorten" which are the characteristics of an image which makes them appear to be seeking a vanishing point in a three dimensional space.

PRIOR SYSTEMS

In the patent application of James W. Norman, III, Ser. No. 436,066, now U.S. Pat. No. 4,533,952, entitled, "Digital Video Special Effects System", assigned to the assignee of this application, there is disclosed a digital special effects system which will invert and rotate video images. However, this system as well as other existing picture manipulation systems cannot add the feature of perspective to manipulated images. In the prior art systems, the vertical and horizontal coordinates of the manipulated picture are provided by the central processing unit to the X and Y function registers. In order to create perspective the registers would need to change at the line and pixel rate but the central processing units are incapable of providing manipulated data at this speed.

In graphics terminology this is known as a perspective projection. This operation projects each point of an object arbitrarily oriented in three dimensional space onto a two dimensional plane. For television effects, the plane is that of the television picture tube. Each point of the image has associated with it an X horizontal, Y vertical and Z depth coordinate. It must be mapped onto the television screen for rasterization eliminating the Z or depth coordinate. Typically, this is done using the follow transformation:

$$X' = XD/Z \text{ and } Y' = YD/Z$$

In these formulas $X'$ and $Y'$ are the new X and Y coordinates on the television screen and X, Y and Z are the three dimensional space coordinates of the point prior to the projection. D is viewing distance. This is the distance from the projection plane from which the viewer will appear to be watching the action. The amount of keystoning observed by the viewer will become more radical as D is decreased, moving the viewer closer to the projection plane.

Generally, in a graphics system the image is first positioned and rotated by performing a matrix multiplication on each point of the object. Then the perspective transformation is applied. This is represented diagramatically in FIG. 1 of the drawings.

In this invention we have taken a different approach. In this invention, dedicated circuits are provided to perform the X and Y function calculations necessary to cause an image to appear to "keystone" or "foreshorten".

SUMMARY OF THE INVENTION

In the above-referenced patent to Norman III a matrix calculation $\cos w \, Kx \sin w \, Kx - \sin w \, Ky \cos w$ Ky, is applied to each point of the original image. w is the desired angle of rotation, "sin" is the sine of the angle, "cos" is the cosine of the angle, Kx is the desired compression in the horizontal direction and Ky is the desired compression in the vertical direction. Then the image is rotated in the plane of the screen by w degrees and compressed by compression factors Kx and Ky horizontally and vertically, respectively.

In non-perspective mode this matrix is supplied at a field rate to the hardware by the central processing unit which may be a micro processor. To generate the perspective transformation the matrix elements must further be modified in the manner indicated above at the pixel rate. The central processing unit which controls the manipulation, is unable to calculate these parameters and supply them to the hardware at this speed. Dedicated hardware is used instead.

An incremental algorithm is employed to implement this. What is actually required is to modify Kx and Ky throughout the field based on the angular rotation of the object about the X and Y axes. The software supplies four initial values and four increments to the perspective hardware based on the angle of rotation about the X or Y axis. Each element in the matrix has an initial value and an increment associated with it.

After the calculations to produce perspective, the manipulator performs a matrix multiplication on the horizontal and vertical values of the image represented. The parameters supplied to the manipulator must be in proportion to the compression to be applied to the image.

In other words, the image size is inversely proportional to the matrix values entered. This is not a linear function. For the incremental circuitry it is necessary to generate a linear function. Therefore, the incrementation circuitry uses values in the form of a compression fraction. This is a linear function. A conversion back to the "times compressed" format is done through a 1/X table reference after each iteration.

By combining the trigometric coefficients that describe Z-axis rotation and those that define keystoning and foreshortening the image is rotated in the plane of the screen and around either the X or Y axis at the same time. As a result all initial values and increments are dependent on angle w and either angle B or angle a which define rotation around the X and Y axis respectively.

Therefore it is an object of this invention to provide a system which can produce an illusion of perspective in a rotating image on a television screen.

It is another object of the invention to teach a novel method of modifying television signals to produce an illusion of perspective in a rotating image on a television screen.

Another object is to provide a system and method to produce the effects of perspective on a television screen when the image is being rotated in more than one plane.

These and other objects, advantages and features of the invention will become apparent from the following description in conjunction with the accompanying drawings.

DETAILED DESCRIPTION OF THE INVENTION

As previously stated, D is the distance from the viewer to the screen along the Z axis. Do is the total distance down the Z axis from the viewer to the object as displayed. Using this convention, the apparent size of an object is defined as D/Do. As the object is rotated around the X or Y axis, the Do value for each point of the object will vary. The size at the center point will remain D/Do. Therefore, the apparent size at the edge of the screen is determined to be:

$$Ko = \text{initial value} = D/Do - \tfrac{1}{2} \text{ screen size in keystone direction} \times \text{increment}.$$

$$Kd = \text{increment} = (\tan B)/Do$$

These values will generate keystoning of an object that is rotated on the X or Y axis but is not rotated in the screen plane about the Z axis.

The parameters for foreshortening are the same except multiplied by cosB. These values are:

$$Fo = \text{initial value} = \cos B \,(D/Do) - \tfrac{1}{2} \text{ screen size}$$

in foreshortening direction x increment $$Fd = \text{Increment} = (\sin B)/Do$$

For B=0 degrees, initial value will go to D/Do and increment will become 0 because sinB=0 and cosB=1.

This is the general form of all the increments and initial values when there is no screen plane rotation, that is, when angle w is 0 as far as rotation about the Z axis is concerned. In order to apply a rotation of angle w to the above values, we must divide each set of increments and initial values by the appropriate trigonometric function from the original matrix.

The resulting values for increment and initial value to generate cos w Kx are: Ko/cos w and Kd/cos w for rotation around the X axis or Fo/cos w and Fd/cos w for rotation around the Y axis.

For the second matrix entry: sin w Kx we have Ko/sin w and Kd/sin w for X axis rotation or Fo/sin w and Fd/sin w for Y axis rotation.

The third matrix entry: —sin w Ky produces Fo/—sin w and Fd/—sin w for X axis rotation or Ko/—sin w and Kd/—sin w for the Y axis case.

The final element in the matrix: cos w Ky produces Ko/cos w and Kd/cos w for rotation around the Y axis or Fo/cos w and Fd/cos w for rotation about the X axis.

Figure 1:
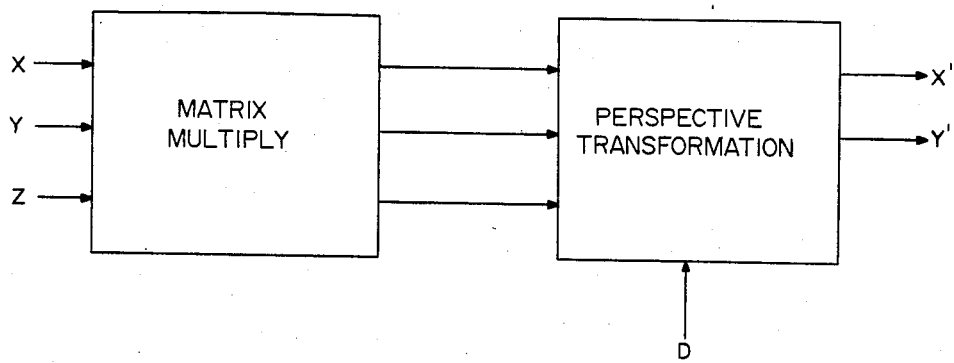
FIG. 1 is a diagramatic representation of the operations performed on X, Y and Z values to obtain $X'$, $Y'$ perspective values.
Figure 2:
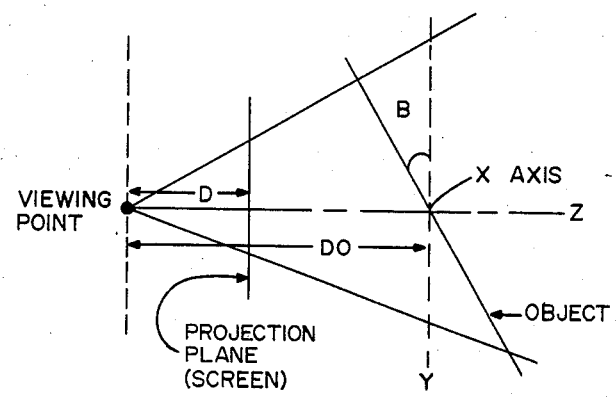
FIG. 2 is a diagramatic representation of the foreshortening and keystoning in a Y, Z plane of an object rotated about the X axis through an angle B.
Figure 3:
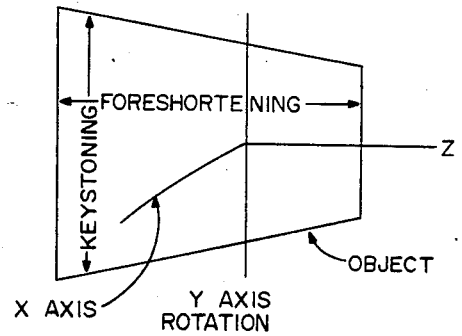
FIG. 3 is a similar representation of foreshortening and keystoning in a Y, Z plane of an object rotated about the Y axis.
Figure 4:
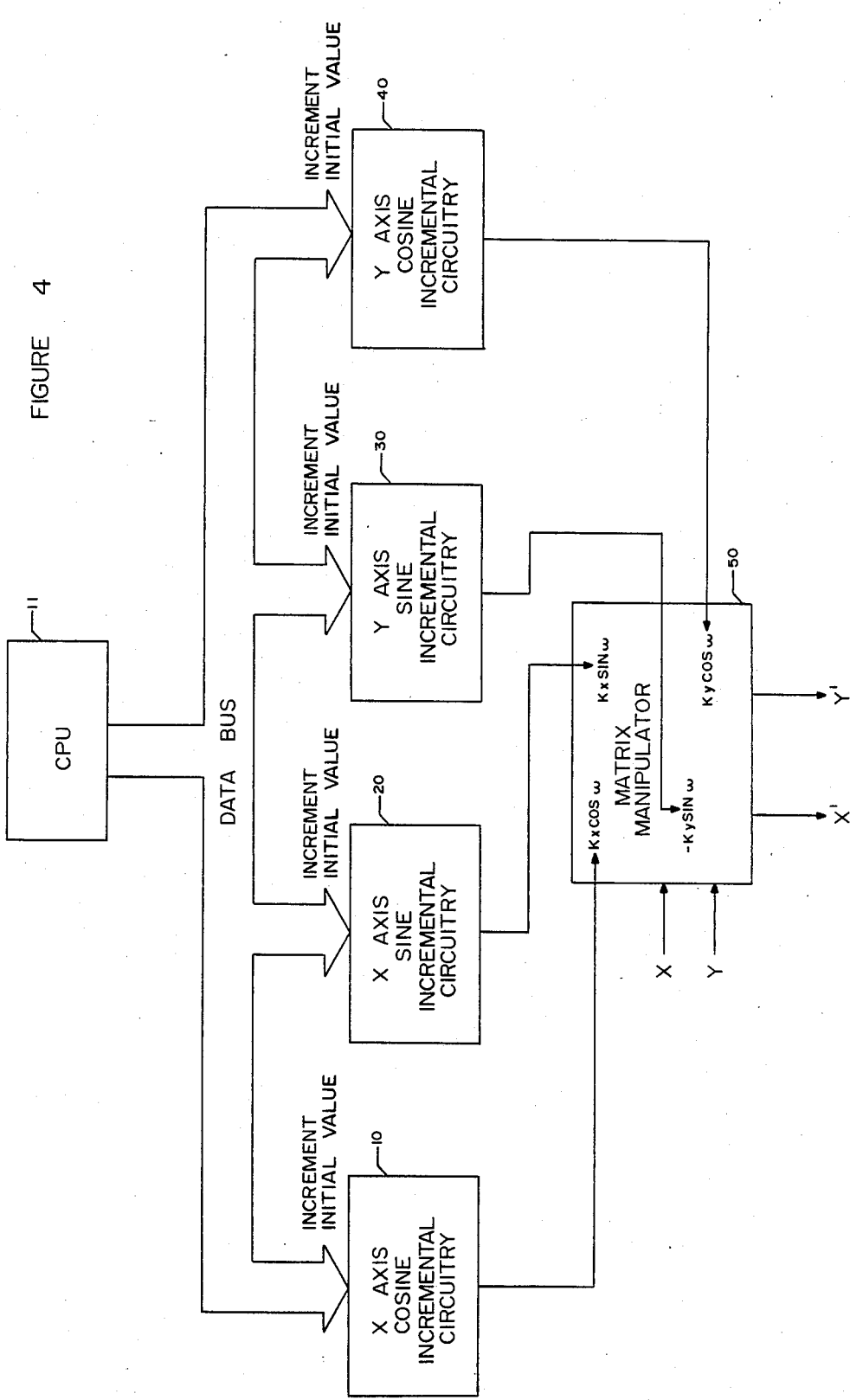
FIG. 4 is an overall block diagram of the system of the invention.

Basically the perspective circuitry consists of four identical sets of incremental circuitry. FIG. 4 is a block diagram of one form of the equipment. Each block 10, 20, 30 and 40, is responsible for generating one parameter to be passed to the matrix manipulator 50. Cosine incremental circuitry 10, generates the value Kx cos w at the pixel or line rate while Sine circuitry 20, produces the second matrix coefficient Kx sin w. The third and fourth sections 30 and 40 calculate the matrix manipulator parameters —Ky sin w and Ky cos w respectively. The matrix manipulator 50, performs a two by two matrix multiply using the four parameters supplied by the perspective hardware with the X and Y raster address. The resulting X' and Y', define a memory address which has the picture data to be displayed at raster address X, Y. Data is read from memory address X', Y' and written to the screen at point X, Y.

Figure 5:
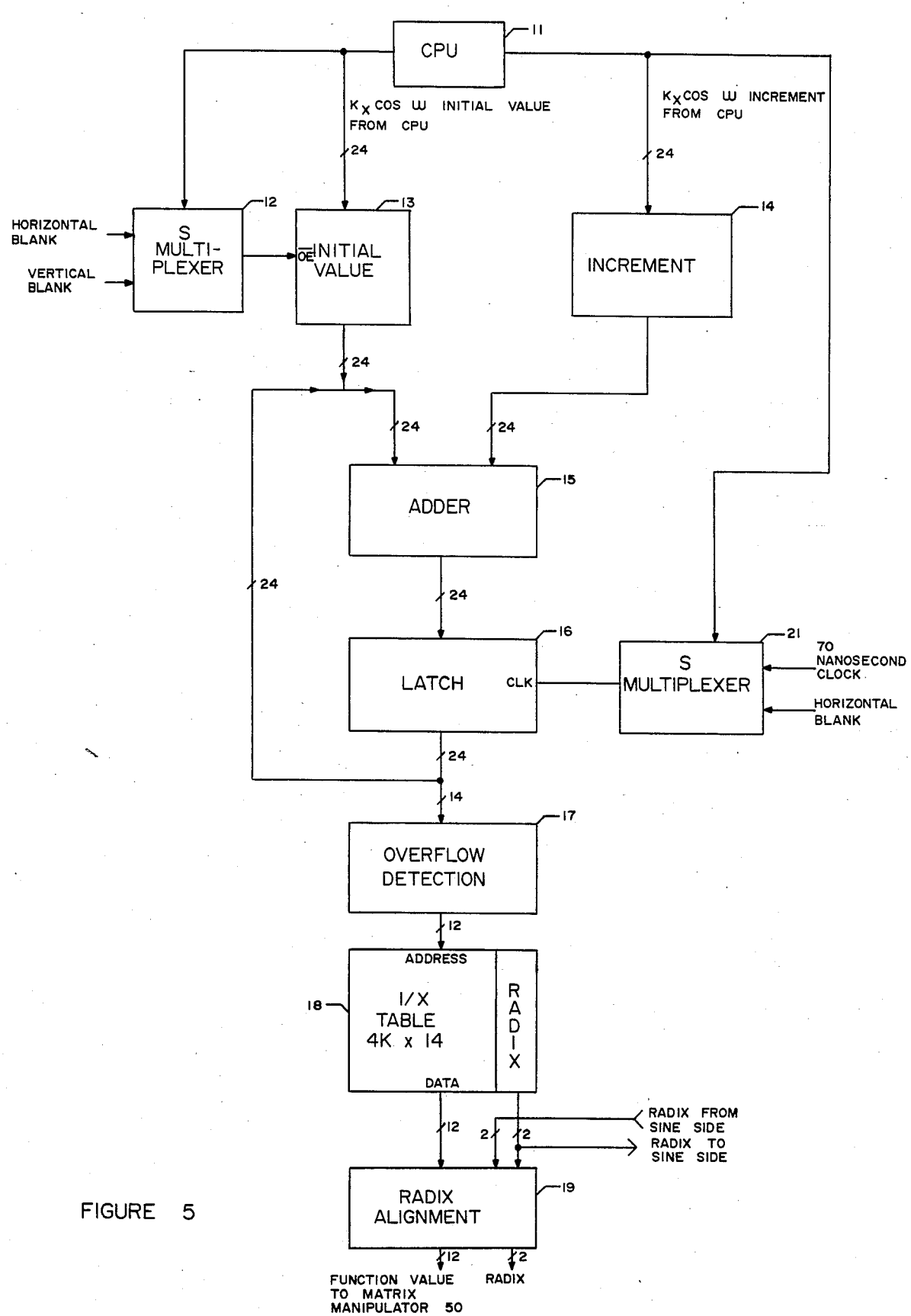
FIG. 5 is a block diagram of the X axis cosine sections of the perspective generating equipment.

FIG. 5 is a more detailed diagram of block 10 in FIG. 4. Once during each television field, the CPU 11 which may advantageously be a microprocessor supplies each of the above sections with an initial value 13 and an increment 14. These values are of the form described in the previous section. During the video blanking period, the increment and initial value are added together by the adder 15. The result is latched back into latch 16 on each clock pulse. The appropriate clock and blanking signal are selected by the CPU 11 by controlling multiplexers 12 and 21. For rotation around the Y-axis, which involves keystoning along the X-axis, pixel rate increments are required. Therefore the CPU selects the 70 nanosecond clock to be enabled through multiplexer 21. For X-axis rotation, line rate increments are required so horizontal blanking is used as the clock. Multiplexer 12 controls when the iterative sum is restored to the initial value. For pixel rate summing, this re-initialization must occur for each line. In this case, multiplexer 12 will supply the horizontal blanking signal to the output enable of the initial value register 13. For line rate clocking, re-initialization must occur once for a field. The vertical blanking signal is used to enable this re-initialization.

During active field periods, the contents of latch 16 and increment register 14 are added together and again stored into latch 16 at each clock period. This produces the linear sum of compression evident in the keystoned shape of the object. Both initial value and increment data are 24 bit numbers organized in the following form.

| 1 Sign bit | 2 overflow bits | 3 zoom bits | 8 whole number bits | 10 fractional bits |
|---|---|---|---|---|

All 24 of these bits are retained during the iterative addition operation. Only 12 bits are used to address the 1/X look-up table 18. The least significant 10 bits are fractional bits and are carried around to maintain accuracy during iterations. The 8 whole number bits are a compression fraction value, ranging from 1/256 times full size up to full size. Therefore accuracy attainable is 1/256th of the screen size. By using the next 3 bits, sizes up to 8 times zoom can be achieved. Again an accuracy is possible to 1/256 of the screen size. The next 2 bits are for overflow. These 2 bits allow overflow of 4 times before the sign bit is affected. The overflow detection section 19 uses these bits along with the sign bit to detect values between 8 and 32 times full size. Any values in this range will address the last entry of the 1/X table 18 because the table only goes up to 8 times zoom.

The sign bit allows for negative and positive numbers. This is necessary for generating objects that are keystoned in either direction. It is also necessary for allowing inversion and rotation when the perspective values are passed on to the matrix manipulator.

The 1/X table 18 is used to convert from compress fraction values used here for iterative operations to times compressed numbers in a radix point format required by the matrix manipulator. The sign bit, the 3 above full size bits and the 8 whole number bits from each addition are used to address the table. The resultant data is of the form 1/compression fraction or times compressed. The associated radix value is also supplied.

The radix format generated by the 1/X table 18 is of a form required by the existing matrix manipulator 50. Multiplications within the matrix manipulator are done on 12 bit values. In order to maintain the required accuracy through the entire range of values involved, a floating fractional point (radix point) is maintained. This radix point may be designated at 1 of 4 different places within the value passed to the manipulator. The 2 bit radix point specified is stored with the value in the 1/X table 18 and passed with the value to the matrix manipulator 50.

In matrix manipulator 50, Sine and Cosine values X and Sine and Cosine values for Y must share common radix points. The respective outputs of the 1/X table 18 for the cosine side and the sine side of the perspective circuitry may have different radix format. This will be true for Z-axis rotation angles near any multiple of 90°. The radix alignment block 19 converts one value to the radix form of the other based on which has the most appropriate radix value.

In this case the most appropriate value is that which has the most whole number digits. In order to align one value to the other, the value with the most fractional digits must shift right until each one has an equal number of fractional digits.

It will be obvious to those skilled in the art that many variations may be made in the preferred embodiment here presented, without departing from the scope of the present invention as described herein and as claimed in the appended claims.

What is claimed is:

1. A television special effects system to produce the illusion of perspective in an image displayed on a television screen, the system comprising means for taking and for storing in a memory pixel by pixel samples of the television signal, means for reorienting the signal information in the memory to produce a desired rotation of the television image about an axis parallel to the plane of the television screen and about another axis perpendicular to the plane of the television screen and means effective to apply incremental values by an addition function to the dimensions of the image displayed on the screen in a manner to produce foreshortening and keystoning of the image in proportion to the desired degree of rotation of the image about said axes.

2. A television special effects system to produce the illusion of perspective in an image displayed on a television screen, the system comprising means for taking and for storing in a memory pixel by pixel samples of the television signal, means for reorienting the signal information in the memory to produce a desired rotation of the television image about an axis perpendicular to the plane of the television screen, and means effective to apply incremental values by an addition function to the dimensions of the image displayed on the screen in a manner to produce foreshortening and keystoning of the image in proportion to the desired degree of rotation of the image about said axis.

3. A method of producing special effects in a television display including the steps of obtaining and storing sequentially in a memory the information contained in a television signal defining the image to be displayed, calculating an initial value and an incremental value based on the desired degree of rotation of the image about each axis, performing an incremental transformation on the stored information by adding sequentially to each bit of information to be displayed a sum equal to said initial sum serially increased by said incremental value to produce foreshortening and keystoning of the image in proportion to the desired degree of rotation of the image about any one of the three axes defining a three dimensional space, and then performing a further incremental transformation on the stored information representing the dimensions of the image by adding a value in proportion to the compression to be applied to the image to indicate its rotation about said any one of the three axes.

4. A method as set forth in claim 3 in which the calculation of initial and incremental values is performed in a central processing unit and the incremental transformation on the stored information is performed in dedicated hardware.

* * * * *